US009456702B2

(12) United States Patent
Miyata et al.

(10) Patent No.: US 9,456,702 B2
(45) Date of Patent: Oct. 4, 2016

(54) SEAT WITH VENTILATIVE PROPERTY (71) Applicant: TACHI-S CO., LTD., Tokyo (JP)

(72) Inventors: Kei Miyata, Tokyo (JP); Junpei Yoshikawa, Tokyo (JP)

(73) Assignee: TACHI-S CO., LTD. (JP)

( * ) Notice: Subject to any disclaimer, the term of this patent is extended or adjusted under 35 U.S.C. 154(b) by 0 days.

(21) Appl. No.: 14/528,471

(22) Filed: Oct. 30, 2014

(65) Prior Publication Data

US 2015/0158405 A1    Jun. 11, 2015

(30) Foreign Application Priority Data

Dec. 5, 2013   (JP) .................................. 2013-251742

(51) Int. Cl.
| A47C 7/74 | (2006.01) |
| B60N 2/56 | (2006.01) |
| A47C 27/12 | (2006.01) |
| A47C 27/14 | (2006.01) |

(52) U.S. Cl.
CPC ............ *A47C 27/125* (2013.01); *A47C 7/746* (2013.01); *A47C 27/14* (2013.01); *B60N 2/5642* (2013.01); *B60N 2/5664* (2013.01)

(58) Field of Classification Search
CPC ........ A47C 7/746; A47C 7/18; A47C 27/22; B60N 2/5642; B60N 2/565; B60N 2/5644; B60N 2/5664
See application file for complete search history.

(56) References Cited

U.S. PATENT DOCUMENTS

| 5,183,708 A | * | 2/1993 | Yoshida | .................. | D04H 1/54 |
| | | | | | 156/308.2 |
| 6,003,950 A | * | 12/1999 | Larsson | .................. | A47C 7/74 |
| | | | | | 297/180.13 |
| 6,976,734 B2 | * | 12/2005 | Stoewe | ............... | B60N 2/5657 |
| | | | | | 297/180.1 |
| 7,083,227 B2 | * | 8/2006 | Brennan | .................. | A47C 7/74 |
| | | | | | 297/180.14 |
| 2011/0109128 A1 | * | 5/2011 | Axakov | ................. | A47C 7/744 |
| | | | | | 297/180.1 |
| 2015/0165946 A1 | * | 6/2015 | Taguchi | ................. | A47C 31/02 |
| | | | | | 297/452.42 |

FOREIGN PATENT DOCUMENTS

| EP | 0633161 A1 | * | 1/1995 | ............... A47C 7/18 |
| EP | 1389558 A1 | * | 2/2004 | ............... A47C 7/18 |
| JP | 2012-115515 | | 6/2012 | |
| WO | WO 2014080614 A1 | * | 5/2014 | .......... B60N 2/5642 |
| WO | WO 2014085907 A1 | * | 6/2014 | .......... B60N 2/5642 |
| WO | WO 2015045874 A1 | * | 4/2015 | ............. A47C 27/22 |

OTHER PUBLICATIONS

Machine Translation of JP2012115515, Nov. 17, 2015.*

* cited by examiner

*Primary Examiner* — Ryan Kwiecinski
(74) *Attorney, Agent, or Firm* — Ostrolenk Faber LLP

(57) ABSTRACT

In a seat with ventilation property, at least one three-dimensional network cushion element is provided in a foam padding(s) of the seat at at least one point on which at least one body portion of a seat occupant is to be substantially contacted. The three-dimensional network cushion element is formed by a plurality of fibers, each being composed of a core portion and a sheath portion covering the core portion, such that all the fibers are bonded with one another at the respective sheath portions thereof. Preferably, each of the fibers may be an helical fiber of eccentric core type wherein the core portion is eccentrically positioned in the sheath portion. Further, the three-dimensional network cushion element(s) may be arranged in the foam padding so as to prevent intensive exertion of a load from the seat occupant's body portion(s) upon the three-dimensional network cushion element(s).

17 Claims, 6 Drawing Sheets

SEAT WITH VENTILATIVE PROPERTY

BACKGROUND OF THE INVENTION

1. Field of the Invention

The present invention relates to a vehicle seat (including an automotive seat) having a ventilation function. In particular, the invention is directed to a vehicle seat of this kind, which has ventilation portions defined at the regions adapted to be contacted by a seat occupant's back portion, buttock portions and thigh portions in order to prevent those seat occupant's body portions from becoming sweaty with perspiration.

2. Description of Prior Art

One example of conventional vehicle seats having a ventilation function is disclosed in Japanese Laid-Open Patent Publication 2012-115515 (hereinafter, "JP 2012-115515 A1"). This publication teaches provision of a three-dimensional air-permeable network cushion element in an urethan foam padding provided in a seat cushion of vehicle seat, at a location on which two thigh portions of a seat occupant are to be rested. The three-dimensional air-permeable network cushion element is formed by entangling a plurality of fibers of thermoplastic resin material with one another and thermally fusing them together at their mutually contacted points. Thus, many spaces among the fibers permit flow of air therethrough for sufficient ventilation at the region to be contacted by the two thigh portions of seat occupant in the seat cushion, thereby preventing the thigh portions from becoming sweaty.

Although not shown in the JP 2012-115515 A1 above, as any person skilled in the art will readily consider, the foregoing network cushion element for the ventilation purpose can be applied to a seat back of vehicle seat at one or more required regions to be contacted by a back portion of a seat occupant, in order to prevent the back portion from becoming sweaty. However, the inventor and assignee of the present invention have not found any prior art material which exactly shows use of the similar network cushion element in the seat back for ventilation purpose.

According to the JP 2012-115515 A1, the three-dimensional air-permeable network cushion element is disposed in an entire forward half area of the seat cushion, as a result of which, a weight or load is applied from the seat occupant's thigh portions directly to that network cushion element. Hence, as the seat occupant has used the seat for a long period of time, the resiliency or repulsive forces of the fibers in the network cushion element become decreased more rapidly than thought, so that a cushiony touch of the whole network cushion element will soon be deteriorated to an unfavorable degree. Further, with the decrease of repulsive forces of the fibers, it is highly possible that the network cushion element will not maintain its original shape and thickness, and therefore will become settled downwards into a permanent depressed and thin state, which is "permanent settling" of the network cushion element. In other words, substantially the forward half area of the seat cushion may be subjected to downward perment settling and become small in thickness, which will impair the outer appearances of the seat undesirably. Also, most of the fibers in so depressed network cushion element will be squeezed and closely contacted with one another, as a result of which, the spaces among the fibers will be so narrow as to obstruct smooth ventilation of air therethrough. Thus, in this prior art, it is likely that a useful life of the seat will be shorten in terms of its ventilation effect as well as of its outer aesthetic appearance.

SUMMARY OF THE INVENTION

In view of the afore-stated drawbacks, it is a first purpose of the present invention to provide a seat with ventilation function, the seat including a seat cushion and a three-dimensional network cushion element provided in the seat cushion, which can lessen the possibility of a permanent settling or depression of the three-dimensional network cushion element as well as the seat cushion, thereby realizing a long useful life of the seat In order to achieve such first purpose, in accordance with the present invention, there is provided a vehicle seat with ventilation function which basically comprises:

a foam padding provided in the seat cushion, the foam padding having: an upper surface facing to an upper side of the seat cushion on which a seat occupant is to sit; and a bottom surface facing to a bottom side of the seat cushion; and a three-dimensional network cushion element of an air permeable property, the three-dimensional network cushion element being formed by a plurality of fibers, each being of a sheathed core construction;

wherein each of the plurality of fibers is composed of a core portion and a sheath portion covering outer surfaces of the core portion, wherein the three-dimensional network cushion element is disposed within the foam padding at a point on which a body portion of the seat occupant is to be contacted at the seat cushion, and wherein the three-dimensional network cushion element penetrates the foam padding, in such a manner that one end of the three-dimensional network cushion element is exposed at the upper surface of the foam padding, whereas the other end of the three-dimensional network cushion element is exposed at the bottom surface of the foam padding.

As one aspect of the present invention, it may be so arranged that, in each of the plurality of fibers, the core portion is disposed eccentrically within the sheath portion so as to be apart from a central axis of the sheath portion, whereupon a plurality of eccentric-core-type fibers are provided, each of which has a thick region and a thin region defined in the sheath portion in relation to the core portion, and that the three-dimensional network cushion element is formed by the plurality of eccentric-core-type fibers which are partly contacted and fused with one another, in such a manner that outer surfaces of the sheath portion of one of the eccentric-core-type fibers corresponding to the thick region thereof are partly contacted and fused with outer surfaces of the sheath portion of the other of the eccentric-core-type fibers corresponding to the thick region thereof. Preferably, those core and sheath portions may each be formed from a thermoplastic synthetic resin material, on the condition that the sheath portion is lower in melting point than the core portion As another aspect of the invention, each of the plurality of fibers may be curved in a helical fashion, such that the thin region of the sheath portion is oriented inwardly of the fiber being thus helically curved, while the thick region of the sheath portion is oriented outwardly of the fiber being thus helically curved, thereby providing a helical fiber whose all outer sides in which the thick region exists are exposed outwardly over all strokes of helix of the helical fiber. A plurality of such helical fibers be bonded with one another at predetermined points to form the three-dimensional network cushion element.

As still another aspect of the invention, in the case where the body portion of the seat occupant is two thigh portions of the seat occupant, it may be so arranged that a pair of the aforesaid three-dimensional network cushion elements are provided, and that the pair of three-dimensional network cushion elements are disposed in the foam padding in a manner spaced apart from each other, such that one of the pair of the three-dimensional network cushion elements is situated at a first point on which one of the two thigh portions is to be contacted, whereas the other of the pair of the three-dimensional network cushion elements is situated at a second point on which the other of the two thigh portions is to be contacted.

As yet another aspect of the invention, in the case where the body portion of the seat occupant is one set of thigh and knee portions of the seat occupant and another set of thigh and knee portions of the seat occupant, it may be so arranged that a pair of the three-dimensional network cushion elements are provided, and that the pair of the three-dimensional network cushion elements are disposed in the foam padding in a manner spaced apart from each other, such that one of the pair of the three-dimensional network cushion elements is situated at a first point on which the aforesaid one set of thigh and knee portions is to be contacted at the seat cushion, whereas the other of the pair of the three-dimensional network cushion elements is situated at a second point on which the aforesaid another set of thigh and knee portions is to be contacted at the seat cushion.

As yet still another aspect of the invention, in the case where the body portion of the seat occupant is two thigh portions and buttock portion of the seat occupant, it may be so arranged that:

a) in the foam padding, there are defined: a pair of first areas on which the two thigh portions are to be substantially contacted, respectively; and a pair of second areas on which the buttock portion is to be substantially contacted, b) the three-dimensional network cushion element has an upper surface facing to the upper side of the seat cushion and a bottom surface facing to the bottom side of the seat cushion, and c) the three-dimensional network cushion element is so formed to define:

a pair of first portions (at 102a and 102a) which are respectively disposed at two locations which substantially correspond to the pair of first areas of the foam padding, respectively; the pair of first portions each having an end exposed at the bottom side of the seat cushion;

a pair of second portions (at 102b and 102b) which are respectively disposed at two locations which substantially correspond to the pair of second areas of the foam padding, respectively; the pair of second portions each having an end exposed at the bottom surface of the three-dimensional network cushion element;

at least one intermediate portion defined between the pair of first portions and the pair of second portions;

both the pair of first portions and the pair of second portions extending from the at least one intermediate portion towards the upper surface of the three-dimensional network cushion element; and a third portion extending from the at least one intermediate portion to the bottom surface of the three-dimensional network cushion element, the third portion having an end exposed at the bottom side of the seat cushion.

It is a second purpose of the present invention to provide a seat with ventilation function, the seat including a seat back and a three-dimensional network cushion element provided in the seat back, which can lessen the possibility of a permanent settling or depression of the three-dimensional network cushion element as well as the seat back, thereby realizing a long useful life of the seat In order to achieve such second purpose, in accordance with the present invention, there is provided a vehicle seat with ventilation function, which basically comprises:

a foam padding provided in the seat back, the foam padding having: a front surface facing to a forward side of the seat back on which an upper body portion of a seat occupant is to be contacted; and a rear surface facing to a rearward side of the seat back; and a three-dimensional network cushion element of an air permeable property, the three-dimensional network cushion element being formed by a plurality of fibers, each being of a sheathed-core construction;

wherein each of the plurality of fibers is composed of a core portion and a sheath portion covering outer surfaces of the core portion, wherein the three-dimensional network cushion element is disposed within the foam padding at a point on which a predetermined part of the upper body portion of the seat occupant is to be contacted at the seat back, and wherein the three-dimensional network cushion element penetrates the foam padding, in such a manner that one end of the three-dimensional network cushion element is exposed at the front surface of the foam padding, whereas the other end of the three-dimensional network cushion element is exposed at the rear surface of the foam padding.

In such mode of the present invention, as one aspect thereof, it may be so arranged that, in each of the plurality of fibers, the core portion is disposed eccentrically within the sheath portion so as to be apart from a central axis of the sheath portion, whereupon a plurality of eccentric-core-type fibers are provided, each of which has a thick region and a thin region defined in the sheath portion in relation to the core portion, and that the three-dimensional network cushion element is formed by the plurality of eccentric-core-type fibers which are partly contacted and fused with one another in such a manner that outer surfaces of the sheath portion of one of the eccentric-core-type fibers corresponding to the thick region thereof are partly contacted and fused with outer surfaces of the sheath portion of the other of the eccentric-core-type fibers corresponding to the thick region thereof. Preferably, those core and sheath portions may each be formed from a thermoplastic synthetic resin material, on the condition that the sheath portion is lower in melting point than the core portion Further, in this mode of the invention, as another aspect thereof, each of the plurality of fibers may be curved in a helical fashion, such that the thin region of the sheath portion is oriented inwardly of the fiber being thus helically curved, while the thick region of the sheath portion is oriented outwardly of the fiber being thus helically curved, thereby providing a helical fiber whose all outer sides in which the thick region exists are exposed outwardly over all strokes of helix of the helical fiber. A plurality of such helical fibers be bonded with one another at predetermined points to form the three-dimensional network cushion element.

Furthermore, in this mode, in the case where the predetermined part of the upper body portion of the seat occupant is a localized part of a back portion of the seat occupant, at least one piece of the three-dimensional network cushion element may be disposed in the foam padding at a point on which the localized part of the back portion is to be contacted.

Other various features and advantages will become apparent from reading of the description, hereinafter, with reference to the accompanied drawings.

DETAILED DESCRIPTION OF PREFERRED EMBODIMENTS OF THE INVENTION

Hereinafter, referring to the annexed drawings, a detailed description will be made of refereed embodiments of a seat with ventilation function in accordance with the present invention.

Figure 1:
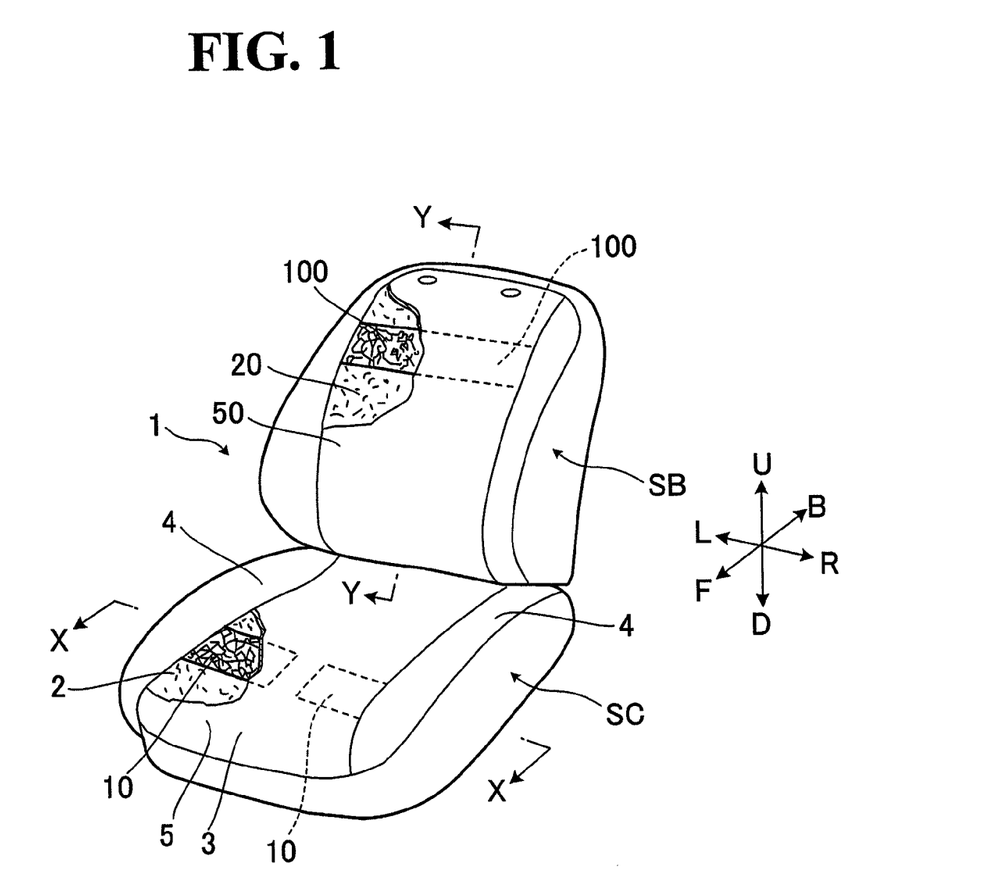
FIG. 1 is a schematic partly-broken perspective view of a seat with ventilation function in accordance with the present invention, which indicates three-dimensional network cushion elements arranged in seat cushion and seat back of the seat.

FIG. 1 shows, in perspective, a seat with ventilation function, which is generally designated by 1. This seat 1 comprises a seat cushion SC and a seat back SB, each having a ventilation function to be explained in great details later.

The designations F, B, L, R, U and D in the Figures represent the following directions: "Forward", "Backward", "Leftwise", "Rightwise", "Upward" and "Downward", respectively. Note that the wording, "forward," "forwardly" and "front", refer to the forward direction F of the seat 1, the wording, "rearward", "rearwardly" and "rear", refer to the rearward direction B of the seat 1, and the wording "left" and "right" refer to the left and right sides (at L and R) of the seat 1, respectively.

Figure 2:
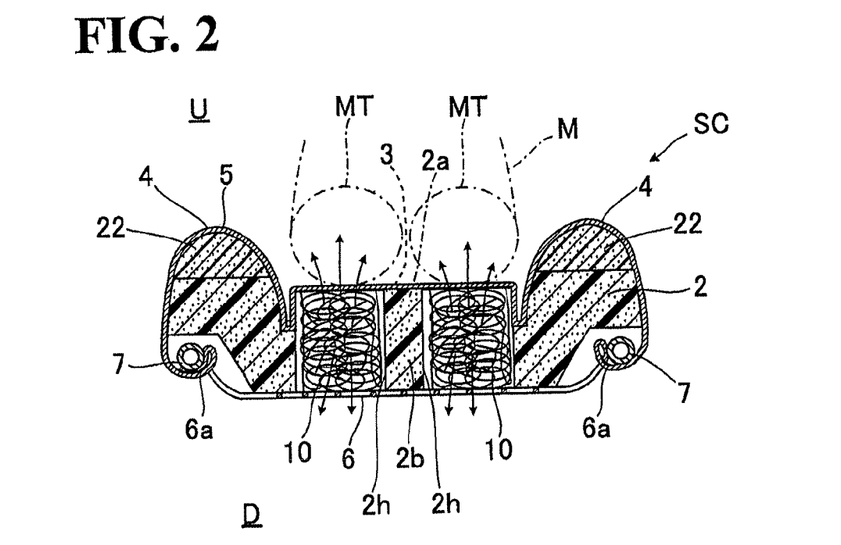
FIG. 2 is a sectional view taken along the line X-X in the FIG. 1, which shows a pair of spaced-apart three-dimensional network cushion elements provided in the seat cushion, as a first embodiment of the invention.

As shown in FIG. 2, the seat cushion SC includes: a main foam padding 2 formed of an urethan foam material, which has a seating surface area 3 on which buttock and thigh portions of a seat occupant are to be rested; and a pair of left and right foam padding portions 22 and 22 which protrude upwardly from a plane of the seating surface area 3. Those two foam padding portions 22 and 22 constitute left and right side bolster portions 4 and 4 of the seat cushion SC, respectively. The main foam padding 2 as well as the two foam padding portions 4 are covered with a breathable surface cover element 5 appropriately. The bottom side of the main foam padding 2 is supportively received on a spring assembly 6 comprising a plurality of S springs arrayed on a horizontal plane, wherein ends of the spring assembly 6 are securely connected to a seat cushion frame 7.

Referring to FIGS. 1 and 2, a pair of left and right air vents 2h and 2h are shown to be formed in the main foam padding 2. The left air vent 2h is situated at a left localized area of the main foam padding 2 and penetrates it vertically, wherein that left localized area is adapted to substantially receive a left thigh portion MT of a seat occupant M. On the other hand, the right air vent 2h is situated at a right localized area of the main foam padding 2 and penetrates it vertically, such right localized area being adapted to substantially receive a left thigh portion MT of the seat occupant M. Respectively filled and secured in those two air vents 2h and 2h are a pair of three-dimensional air-permeable network cushion elements 10 and 10 for ventilation purpose. Hereinafter, such wording, three-dimensional air-permeable network cushion element, shall be referred to as "network cushion element" for short.

In accordance with the present invention, in brief, the network cushion element 10 per se is formed by a plurality of fibers 23, each being of a sheathed single-core structure, such that the fibers 23 are thermally fused with one another at their mutually contacted points to form the three-dimensional network structure on the whole.

Figure 4:
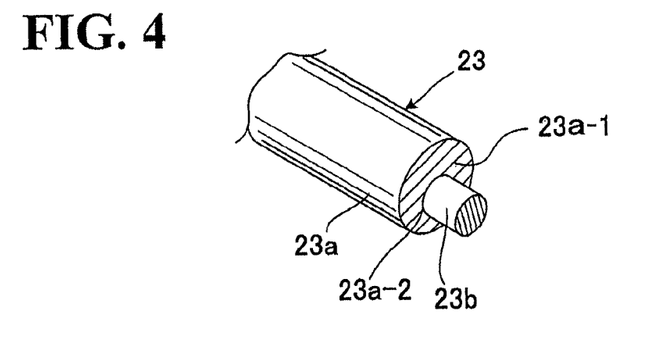
FIG. 4 is a partly-broken, fragmentary-sectional perspective view of a fiber which is to be helically curved and used for forming the three-dimensional network cushion element.
Figure 6:
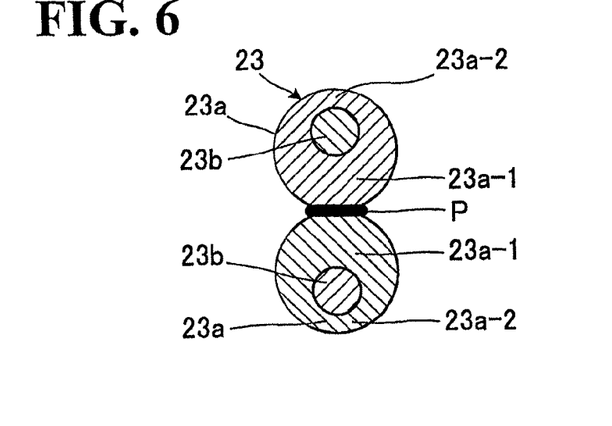
FIG. 6 is a cross-sectional view showing a state where one helical fiber is fused and boded with another helical fiber.

More specifically, as best shown in FIG. 4, each fiber 23 employed in the present invention is formed by: a core portion 23b extending in the longitudinal direction thereof; and a sheath portion 23a covering a whole of that core portion 23b along the longitudinal direction, whereupon the fiber 23 has a sheathed core structure. In particular, the core portion 23b is disposed eccentrically within the sheath portion 23a so as to be dislocated from the central axis of the latter 23a, as best seen in FIG. 6. Therefore, due to such eccentric core structure, the sheath portion 23a has a thick region 23a-1 and a thin region 23a-2 which are defined on the opposite sides of the core portion 23b within that sheath portion 23a. As will be described later, in assembly of the network cushion element 10, the thick region 23a-1 serves as contact and fusing areas where a plurality of the fibers 23 are to be contacted and thermally fused with one another, and the core portion 23b serves to reinforce the fiber 23 to maintain a strength of the resultant network cushion element.

The core portion 23b may, for example, be formed from a selected one of polyolefin, polyester, and polyethylene. With regard to the sheath portion 23a, likewise, the polyolefin, polyester and polyethylene may be used, which however must be lower in melting point than those used for the core portion 23b. Of course, this is not imitative, but any other thermoplastic material may be used for both of the core and sheath portions 23b and 23a, insofar as the melting point of the material for the sheath portion 23a is lower than the melting point of the material for the core portion 23b.

Because of the above-described eccentric core formation in the sheath portion, the fiber 23 can easily be curved in a helical fashion, with the thin region 23a-1 of its sheath portion 23a being naturally oriented inwardly of the helically curved fiber 23, while on the other hand, the thick portion 23a-2 thereof is being naturally oriented outwardly of the helically curved fiber 23. In that manner, one helical fiber 23 is formed, which can be observed from FIG. 5A. Hence, it is to be appreciated that, in the resultant helical fiber 23, a whole of the thick region 23a-2 of the sheath portion 23 is helically situated along the overall outwardly-facing sides of the fiber 23. In other words, all outer lateral sides of the helical fiber 23, in which the thick region 23a-2 exists, are exposed to the outside over all strokes of helix of that fiber.

Figure 5A:
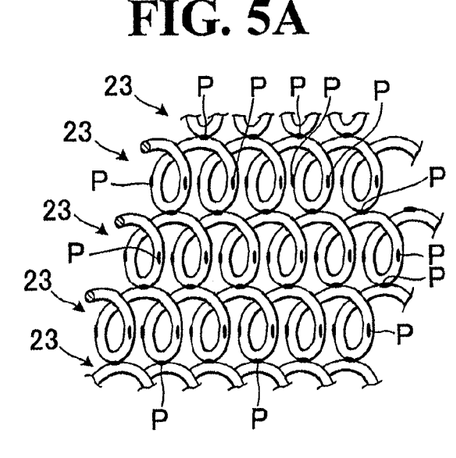
FIG. 5A is a schematic diagram showing an inner structure of the three-dimensional network cushion element as viewed from one lateral side thereof, wherein it can be seen that a plurality of helical fibers (each being formed from the aforesaid fiber shown in FIG. 4) are fused and bonded with one another at their respective fusing points in an orderly manner.
Figure 5B:
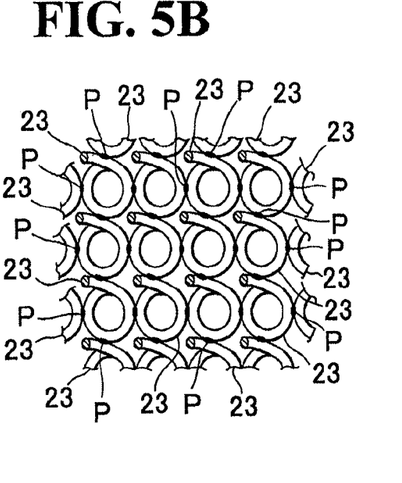
FIG. 5B is a schematic diagram which shows, in plan, the inner structure of the three-dimensional network cushion element in association with the FIG. 5A, wherein it can be seen that the plurality of helical fibers are fused and boded with one another at their respective fusing points in an orderly manner.

Then, a required number of so formed helical fibers 23 are provided. And subsequently, all the helical fibers 23 are contacted with one another at their respective outer surfaces and then subjected to thermal fusing at fusing points (at P), thereby forming one integral assembly of helical fibers 23 which constitutes a three-dimensional configuration of the network cushion element 10. In this regard, it is to be seen that the fusing is effected only to the thick regions 23a-2 at the fusing points P, because the thick region 23a-2 occupies all outwardly facing sides of each of the helical fibers 23 as stated above. At this step, as can be seen in FIGS. 5A and 5B, all the helical fibers 23 are fused with one another at their respective four equidistant points (at P) over all the strokes of helix thereof, whereupon all the helical fibers 23 are arrayed in an orderly manner in the horizontal and vertical directions. The FIG. 5A is a schematic diagram which roughly shows an inner structure of such one integral assembly of helical fibers 23 forming the network cushion element 10, as viewed from one lateral side thereof, which indicates that a plurality of the helical fibers 23 are fused with one another over all the strokes of helix thereof. The FIG. 5B is a schematic diagram which shows, in plan, the inner structure of the said one integral assembly of helical fibers 23 forming the network cushion element 10, from which it can be seen that all the helical fibers 23 are fused with one another at all the fusing points P and arrayed in an orderly manner like a lattice pattern.

Accordingly, in the network cushion element 10 thus formed, all the fibers 23 are fused with one another in the thick regions 23a-2 only. This means that, during the fusing process, heat is applied to such thick regions 23a-2 only, so that the thick regions 23a-2 are partly melted and fused with one another, as best seen in FIG. 6. Hence, the core portion 23b is protected by the thick region 23a-2 against the heat and therefore prevented from being damaged or broken during the fusing process. As such, the double structure of each helical fiber 23, formed by the core and sheath portions 23b and 23a, are maintained in an optimum condition, so that the network cushion element 10 formed by such helical fibers 23 provides a great resilient repulsive force and a highly increased degree of resilient recovery to its original shape, in comparison with the conventional network cushion element described previously.

While not shown, specific method for forming the network cushion element 10 may for example comprise the steps of: providing a required number of columnar support elements; then winding and securely attaching one helical fiber 23 about each of the columnar support elements; thereafter, contacting all the columnar support elements with one another in an orderly way, so that all the helical fibers 23 are kept in contact with one another at their respective four equidistant points in every of their respective strokes of helix (like the manner shown in FIGS. 5A and 5B); subjecting all those columnar support elements to thermal fusing appropriately, thereby fusing all the helical fibers 23 with one another at all the mutually contacted points; and thereafter, removing all the columnar support elements from all the corresponding fused helical fibers 23, respectively, whereby the three-dimensional network cushion element 10 is obtained.

It is to be appreciated that the network cushion element 10 has the following remarkable effects:

a) Each of the helical fibers 23 has an eccentric core portion 23b which is not influenced by heat and not damaged during the fusing, as explained above. Thus, even after the fusing, the core portion 23b fully acts to reinforce an entirety of the fiber 23, which in turn increases the strength and resilient repulsive force of the helical fiber 23 to a much great degree, as compared with an ordinary helical fiber having no core portion therein. The gist and scopes of the present invention, of course, include a fiber of such a concentric core type wherein a core portion is disposed concentrically in a sheath portion, through not shown. As far as the illustrative embodiment is concerned, use of such concentric-core-type fiber is not recommended, because the fiber can not be curved easily in helical fashion as compared with the eccentric-core-type helical fiber 23, and requires an increased thickness of the sheath portion to protect the core portion against damage by heat during the fusing process described above. However, if required for particular design and technical conditions, fibers of this concentric core type may be used in a proper manner.

b) In the network cushion element 10, all the helical fibers 23 are fused and boded with one another at their respective four equidistant points (at P) in every stroke of helix thereof, as shown in FIGS. 5A and 5B. This means that each helical fiber 23 is fixedly connected with adjoining four helical fibers 23 over all the strokes of helix thereof (see FIG. 5A), and therefore, it is to be appreciated that all the mutually fused points (at P) of all the helical fibers 23 are arrayed and scattered in an orderly fashion in all directions (three-dimensionally) within the network cushion element 1, as understandable from both FIGS. 5A and 5B. Accordingly, many well-ordered networked paths are established, through which a load applied to the network cushion element 1 will be widely transmitted and distributed for high efficient, uniform absorption of the load within the network cushion element. Hence, a load or weight of a seat occupant's body portion (e.g. two thigh portions and back portion) applied to the network cushion element 1 is distributed to all of the numerous helical fibers 23 and absorbed thereby in a nearly even way. This makes it hard for the network cushion element 1 to become settled downwards into a permanently depressed and thin state, which is "permanent settling" stated in the preceding description of prior art. Namely, an entirety of the network cushion element 1 is hardly prone to downward permanent settling and therefore highly improved in its strength and resilient repulsive force against an externally applied load. Hence, the resilient recovery of the network cushion element 1 to its original shape can be maintained for quite a long period of time, so that the network cushion element may have a long life of use as compared with the conventional network cushion element.

c) Owing to the three-dimensional uniform rows and array of fibers 23 stated above, the spaces among the filers 23 are also provided in uniform and sufficient manner within the three-dimensional network cushion element 1, thereby insuring smooth, sufficient flow of air therethrough as indicated by the arrows in FIG. 2.

In this context, it is preferable that an end surface of the network cushion element 1, toward which all terminal ends of the fibers 23 are oriented, (which substantially corresponds to the side of the network cushion element shown in the plan view of FIG. 5B) should be positioned at a required area (s)) of the seat cushion SC or the seat back SB on which a body portion of a seat occupant is to be contacted. In that case, all the repulsive forces of the helical fibers 23 can be fully directed and applied to the seat occupant's body portion, with a high efficiency. Further, in each of the helical fibers 23, ostensibly a through-hole is defined inwardly thereof and extends longitudinally thereof, thorough which air may flow straight and smoothly. Thus, in this mode, each of the helical fibers 23 will be resiliently compressed in the longitudinal direction thereof by a load applied thereto from the seat occupant, with the ostensible through-hole (i.e. a straight air path) being substantially maintained in each fiber 23, without being deformed, thereby permitting smooth and sufficient ventilation of air therethrough.

It is noted that the above-described effects will fold true for any of all the embodiments to be described later.

Now, with reference to FIGS. 1 and 2, a description will be made of a first embodiment of a seat cushion SC in accordance with the present invention, which employs the above-described network cushion element 10 formed by the sheathed-core-type helical fibers 23. It is noted that the seat cushion SC to be described hereinafter is the same as the previously-described seat cushion SC.

In this first embodiment, in a generally half forward area of the foam padding 2 of the seat cushion SC, there are formed a pair of spaced-apart left and right air vents 2h and 2h at two predetermined local regions of that foam padding 2 which are adapted to substantially receive the two thigh portions MT and MT of a seat occupant M, respectively. Each air vent 2h is of a rectangular shape as shown, and penetrates the foam padding 2 vertically. A pair of the three-dimensional network cushion elements 10 and 10 are inserted and filled in those two air vents 2h and 2h, respectively. In other words, in advance thereof, each of the two network cushion elements 10 and 10 has been formed in size and shape that are substantially equal to the inner size and shape of each of the two air vents 2h and 2h. In this respect, since the shape of each air vent 2h is rectangular, the network cushion element 10 should be formed in a proper cubic shape (e.g. in a shape of regular hexahedron or rectangular parallelepiped) substantially confirming to the cubic shape of the air vent 2h. As can be seen in FIG. 2, the two network cushion elements 10 and 10, filled in the two air vents 2h and 2h respectively, are both supported by the spring assembly 6 at the bottom surfaces thereof and are also both covered with the surface cover element 5 at the outer surfaces thereof.

According to the present embodiment, the two network cushion elements 10 and 10 are disposed in a spaced-apart relation with each other in the generally forward half area of the main foam padding 2 of the seat cushion SC, thereby avoiding formation of one large network cushion element in the entirety of that generally forward half area of the main foam padding 2, as opposed to the prior art JP 2012-115515 A1 stated previously. Namely, in the case where one large network cushion element is provided in the entirety of such forward half area of the main foam padding 2, a whole of load applied from both two thigh portions MT and MT is intensively directed to a center area of such one large network cushion element, which will possibly expedite downward permanent settling of that particular center area during years of use. Certainly, the network cushion element 10 itself, by the reason of its highly-improved repulsive structure discussed above, will withstand such intensive exertion of the load for quite a long period of time, in comparison with the JP 2012-115515 A1 or other relevant prior arts.

But, in the present embodiment, the spaced-apart disposition of the two network cushion elements 10 and 10 in the seat cushion SC is of a great significance in distributing most of the aforesaid load into the main foam padding 2 and reliably preventing intensive exertion of the load upon the network cushion elements 10. Specifically, as seen in FIGS. 1 and 2, each of the two network cushion elements 10 and 10 is surrounded by the main foam padding 2, which means that several localized regions of the main foam padding 2 are interposed between the left and right network cushion elements 10 and 10 and further interposed between the left upwardly-protruding portion 22 and left network cushion element 10 as well as between the right upwardly-protruding portion 22 and right network cushion element 10. Further, all those network cushion elements 10 and localized regions of the main foam padding 2 are covered by one piece of the surface cover element 5. Hence, when the seat occupant's two thigh portions MT and MT are rested on the seat cushion SC substantially at the two locations corresponding to the respective two network cushion elements 10 and 10, it is to be seen that loads given from the thigh portions MT are first exerted on the surface cover element 5 and then exerted on the two network cushion elements 10, whereupon most of the loads is transmitted via the surface cover element 5 over to the main foam padding 2 that surrounds both two network cushion elements 10, and therefore most of the loads is absorbed in that particular main foam padding 2. As a result thereof, an amount of the load directly applied to each of the two network cushion elements 10 is greatly reduced.

Moreover, when the seat occupant M sits on the seat cushion SC, his or her buttock portion (at MB) is rested on a generally rearward half region of the foam padding 2 opposite to the generally forward half region thereof on which his or her thigh portions MT are rested, so that most of the seat occupant's weight is naturally applied to the generally rearward half region of the foam padding 2. This fact makes a weight of the thigh portions MT small or light relative to a weight of the buttocks portions, and therefore results in additional reduction of the load applied from the thigh portions MT to the two network cushion elements 10. With these arrangements, the application of external loads to both two network cushion elements 10 are considerably reduced, thereby extremely lessening the possibility of downward permanent settling of both two network cushion elements 10, so that the seat cushion SC is quite hardly prone to permanent downward depression, notwithstanding its longtime use. Also, by the virtue thereof, spaces among the fibers 23 are not narrowed, but are maintained sufficient to assure smooth air ventilation therethrough. This effectively provides unchanged good cushiony touch and unchanged smooth ventilation in the seat cushion SC for quite a long period of time. Therefore, a long useful life of the ventilative seat cushion SC can be realized.

In addition, a moisture and heat emitted from the seat occupant's two thigh portions MT due to his or her vital warmth and perspiration will be escaped from the upper side of the seat cushion SC to the bottom side thereof via the corresponding two network cushion elements 10, so that the moisture and heat may be effectively discharged outside of the seat cushion SC to prevent both two thigh portions MT from becoming sweaty. This offers unchanged good comfort to the seat occupant.

While not shown, preferably, a ventilation device such as a fan device may be provided under the bottom side of the seat cushion SC at a point corresponding to each of the two network cushion elements 10 in order to facilitate escape of the moisture and heat emitted from the seat occupant's thigh portions MT.

In this first embodiment, the network cushion element 10 has many helical fibers 23 each having an eccentric core portion 23b therein, which is effective in increasing a strength of the fiber 23 itself. Further, all the helical fibers 23 are fused with one another at their respective four equidistant points (at P) in every stroke of helix thereof (see FIGS. 5A and 5b), as described above. Thus, one integral assembly of those fibers 23 forming the network cushion element 10 is endowed with far-increased strength and resilient repulsive force on the whole, which greatly increases the durability of the network cushion element 10 against a load applied from the seat occupant's thigh portion MT, notwithstanding longtime use of the seat cushion SC, thereby reliably maintaining a good cushiony touch of the seat cushion for quite a long period of time.

Next, as a second embodiment of the present invention, referring to FIGS. 1 and 3, a description will be made of the instance where a network cushion element formed by the helical fibers 23 stated above is applied to the seat back SB, wherein the network cushion element is designated by 100.

Figure 3:
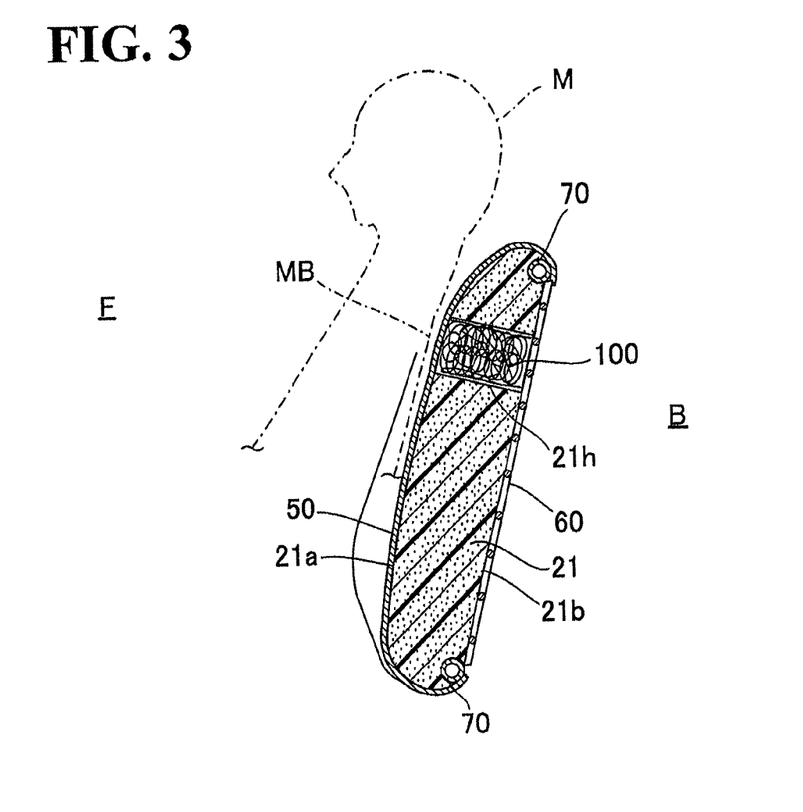
FIG. 3 is a sectional view taken along the line Y-Y in the FIG. 1, which shows a three-dimensional network cushion element provided in the seat back, as a second embodiment of the invention.

As shown in the FIGS. 1 and 3, the seat back SB comprises: a main foam padding 21 made of an urethan foam material; and a breathable surface cover element 50 which substantially covers a front surface area 21a of the main foam padding 21. A rear side 21b of the main foam padding 2 is supportively received on a spring assembly 60 comprising a plurality of S springs arrayed on a vertical plane. Ends of the spring assembly 60 are securely connected to a seat back frame 70.

In the present second embodiment, the network cushion element 100 is provided in the main foam padding 21 so as to extend in a transverse direction of the seat back SB. Similarly to the preceding network cushion element 10, this particular network cushion element 100 also employs the helical fiber 23 comprising the sheath portion 23a and the eccentric core portion 23b disposed eccentrically in the seat portion 23a and is formed from a plurality of such helical fibers 23 in the manner shown in FIGS. 4 to 6. Any further detailed description thereon is omitted for the sake of simplicity.

As shown, formed in an upper region of the main foam padding 21 is a rectangular air vent 21h which is elongated in the transverse direction of the seat back SB. This oblong air vent 21h penetrates the main foam padding 21 in the forward and rearward directions of the seat back SB, such that one end of the air vent 21 opens in a front surface side (at 21a) of the seat back, whereas the other end thereof opens in a rear surface side (at 21b) of the seat back. The network cushion element 100 is formed in shape and size which are substantially equal to the shape and size of the foregoing air vent 21h and is securely filled in an entirely of that air vent 21h. As can be seen in FIG. 3, a front surface side of the network cushion element 100 is covered with the surface cover element 50, whereas a rear surface side of the same 100 is contacted with and supported by the spring assembly 60.

In particular, the network cushion element 100 is disposed in an upper area of the main foam padding 21 which corresponds to a point on which an upper region of a seat occupant's back portion MB is to be contacted. This arrangement advantageously prevents a great load from being directly applied to the network cushion element 100. In other words, when the seat occupant's back portion MB is rested on the seat back SB, most of load is applied from mid and lower regions of that back portion MB, as a great load, to the mid and lower areas of the seat back SB, with the result that the upper region of the seat occupant's back portion MB applies a decreased amount of the load (a small load) to an upper area of the seat back SB. Consequently, the load is not intensively exerted on the network cushion element 100, but most of the load is absorbed into the main foam padding 21 surrounding the network cushion element 100, thereby greatly reducing the application of external loads to the network cushion elements 100. This extremely lessens the possibility of rearward permanent settling of the network cushion element 100 and therefore greatly increases the durability thereof against the load, so that the seat back SB is quite hardly prone to rearward permanent depression, notwithstanding its longtime use. Also, by the virtue thereof, spaces among the fibers 23 are not narrowed, but are sufficiently maintained to assure smooth air ventilation therethrough. Accordingly, it is possible to provide unchanged good cushiony touch and unchanged smooth ventilation in the seat back SB for a lengthened period of time. Therefore, a long useful life of the ventilative seat back SB can be realized.

It is understood that the network cushion element 100 is not limited to the illustrated mode, but for example, a pair of spaced-apart network cushion elements 100 and 100 may be disposed in the upper area of the main foam padding 21, likewise as in the first embodiment. Or, one or more of the network cushion elements 100 may be disposed at any desired location (s) in the main foam padding 21 to permit air ventilation for desired localized part(s) of the seat occupant's back portion MB, in such a fashion as to avoid intensive exertion of a load on the network cushion element 100.

Also in the present embodiment, a moisture and heat emitted from the seat occupant's back portion MB due to his or her vital warmth and perspiration will be escaped from the front side of the seat back SB to the rear side thereof via the network cushion element 100, so that the moisture and heat may be effectively discharged outside of the seat back SB to prevent the back portion MB from becoming sweaty. This offers unchanged good comfort to the seat occupant. Preferably, a ventilation device such as a fan device may be provided to the rear side of the seat back SB at a point corresponding to the network cushion element 100 in order to facilitate escape of moisture and heat from the seat occupant's back portion MB.

Likewise as in the first embodiment, it is understood that the network cushion element 100 is formed by one integral assembly of numerous helical fibers 23, as elaborated earlier, and therefore yields a far-increased strength and repulsive force in the entire body thereof. Thus, the durability of the network cushion element 100 against externally applied loads is greatly increased, thus making it much hard for the network cushion element 100 to become permanently settled in the rearward direction. It is therefore possible to provide unchanged cushiony touch and unchanged smooth ventilation in the seat back SB for quite a long period of time.

Figure 7:
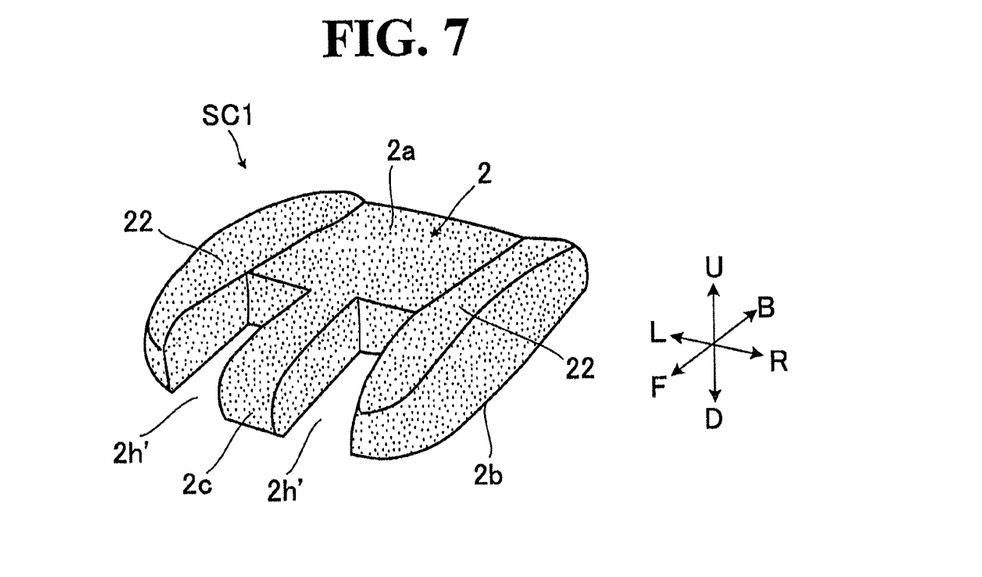
FIG. 7 is a perspective view of a foam padding to be provided in a seat cushion by way of a third embodiment, which shows a pair of spaced-apart cutaway portions formed in that foam padding.
Figure 8:
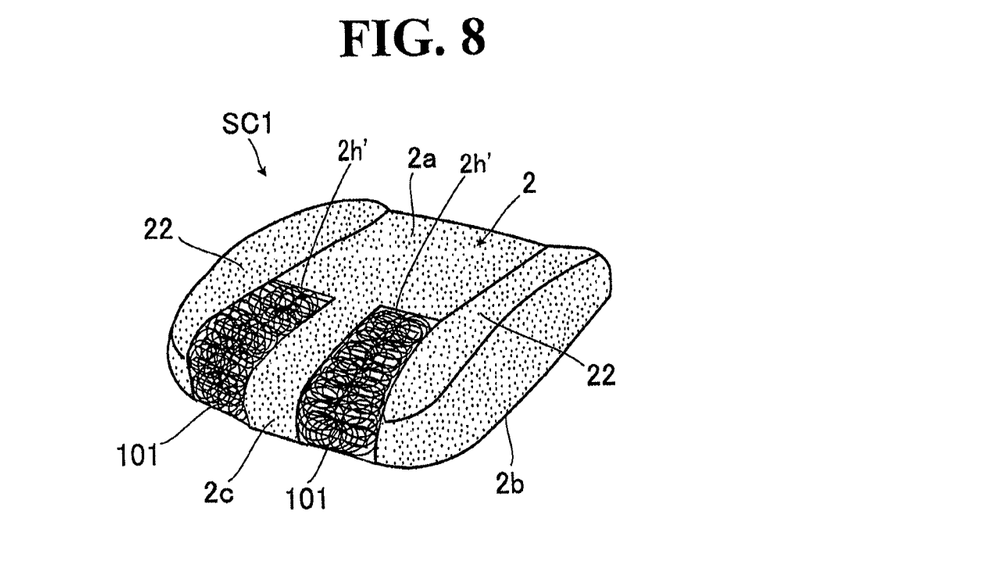
FIG. 8 is a schematic perspective view of the foam padding in which a pair of three-dimensional network cushion elements are filed in the pair of spaced-apart cutaway portion, respectively.

FIGS. 7 and 8 illustrate a third embodiment applied to the seat cushion SC, which suggests extending two thigh-portion ventilation areas (at 10) in the first embodiment to the forward end of the main foam padding of the seat cushion, so that ventilation may be effected not only to the seat occupant's two thigh portions, but also to the seat occupant's two knee portions. Namely, in the present third embodiment, in brief, each of the two three-dimensional network cushion elements formed by the helical fibers 23 as described above is disposed in both forward half area and forward end of main foam padding to permit ventilation for both thigh and knee portions of a seat occupant.

Hereinafter, a specific description will be made of the instance where this third embodiment is applied to the seat cushion SC used in the preceding first embodiment, which includes the main foam padding 2 and the two left and right upwardly-protuding padding portions 22 and 22 corresponding to the two side bolster portions 4 and 4, respectively. Note that the seat cushion is generally designated by SC1.

As shown in FIG. 8, according to the present embodiment, a pair of spaced-apart cutaway vent portions 2h' and 2h' are formed in a generally forward half area of the main foam padding 2. Here, referring to FIG. 2 as well as FIG. 8, It is to be understood that those two cutaway vent portions 2h' and 2h' are respectively defined at two localized regions of the main foam padding 2 which are adapted to receive the two thigh portions MT and MT of a seat occupant, respectively. Further, since both two cutaway vent portions 2h' and 2h' extend to the forward end of the main foam padding 2 and open therein, it is to be understood that the forward region of each of the two cutaway vent portions 2h' is a point adapted to substantially face to the reverse side of each of the two knee portions of a seat occupant, though not shown.

Also, as shown in FIG. 8, a pair of network cushion elements 101 and 101 are provided in this embodiment. Similarly to all the preceding embodiments, each of the two network cushion elements 101 may also be formed by one integral assembly of numerous helical fibers 23 each comprising the sheath portion 23a and the eccentric core portion 23b, the helical fibers 23 being fused with one another at the points P over all their respective strokes of helix thereof, as depicted in FIGS. 4 to 6. This network cushion element 101 is substantially equal in size and shape to each of the two cutaway vent portions 2h' and securely filled therein. As can be seen in the FIG. 8, all the upper and forward end surface portions of each network cushion element 101 filled in the cutaway vent portion 2h' are substantially in registry with the corresponding upper and forward end surface portions of the main foam padding 2, whereas the bottom surface portion of the network cushion element 101 is substantially flash with the corresponding bottom surface of the main foam padding 2.

While now shown, similarly to the first embodiment, all the outer surfaces of the network cushion elements 101 are covered with a breathable surface cover element (as at 5 in FIG. 2), and a rear surface side of the same 101 is contacted with and supported by a spring assembly (as at 6 in FIG. 2) comprising a plurality of S springs arrayed on a horizontal plane.

As constructed above, in the present third embodiment, moisture and heat emitted from the seat occupant's thigh and keen portions due to his or her vital warmth and perspiration will escape from the upper side of the seat cushion SC1 to the bottom side thereof via the two network cushion elements 101 and 101, so that the moisture and heat may be effectively discharged outside of the seat cushion SC to prevent both thigh and knee portions from becoming sweaty. This offers good comfort to the seat occupant. Preferably, a ventilation device such as a fan device may be provided to the bottom side of the seat cushion SC at a point corresponding to the network cushion element 101 in order to facilitate escape of the moisture and heat emitted from the seat occupant's thigh and knee portions.

Also, likewise as in the preceding first embodiment, it is to be appreciated that the two network cushion elements 101 and 101 are spaced apart from each other in the generally forward half area of the main foam padding 2 of the seat cushion SC, thereby avoiding formation of one large network cushion element in the entirety of that generally forward half area of the main foam padding 2. Hence, for all the same reasons set forth in the first embodiment, most of a load applied from the seat occupant's thigh and knee portions will be absorbed into the main foam padding 2 to prevent intensive exertion of the load upon each of the two network cushion elements 101. Further, as explained in the first embodiment, the fact that a weight of the thigh portions is smaller than a weight of the buttocks portions, results in additional reduction of the load applied from the thigh portions to the two network cushion elements 101. Thus, the application of the load to the two network cushion elements 101 is considerably reduced, thereby extremely lessening the possibility of downward permanent settling of both two network cushion elements 101, so that both forward end and upper portions of the seat cushion SC are quite hardly prone to downward permanent depression, notwithstanding its longtime use. Also, by the virtue thereof, spaces among the fibers 23 are not narrowed, but are sufficiently maintained to assure smooth flow of air therethrough. This provides unchanged good cushiony touch and unchanged smooth ventilation in the seat cushion SB for quite a long period of time. Therefore, a long useful life of the ventilative seat cushion SC can be realized.

The network cushion element 101 may also employ the eccentric-core-type helical fiber 23 comprising the sheath portion 23a and the eccentric core portion 23b and may be formed from a plurality of such helical fibers 23 in the manner shown in FIGS. 4 to 6. Thus, one integral assembly of many eccentric-core-type helical fibers 23, forming the network cushion element 101, is endowed with a far-increased strength and resilient repulsive force on the whole, which greatly increases the durability of the network cushion element 101 against loads applied from the seat occupant's thigh and knee portion. Such an arrangement makes it exceedingly hard for the seat cushion SC1 to become permanently depressed downwards, in comparison with the conventional seat cushion using the conventional network cushion element that does not have this type of helical fibers.

FIGS. 9 to 12 shows a fourth embodiment of the present invention, which suggests providing another alternative variant of seat cushion and three-dimensional network cushion elements in the seat 1 for ventilation purpose. The seat cushion in this mode is generally designated by SC2.

Figure 9:
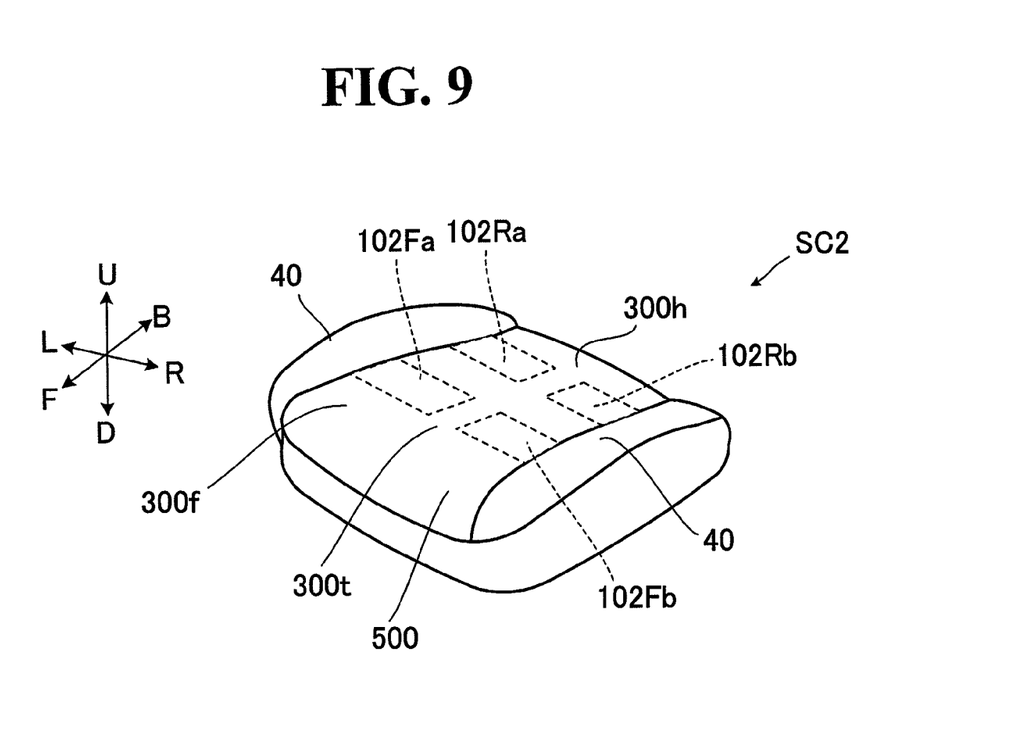
FIG. 9 is a perspective view of a seat cushion in accordance with a fourth embodiment of the invention.
Figure 10:
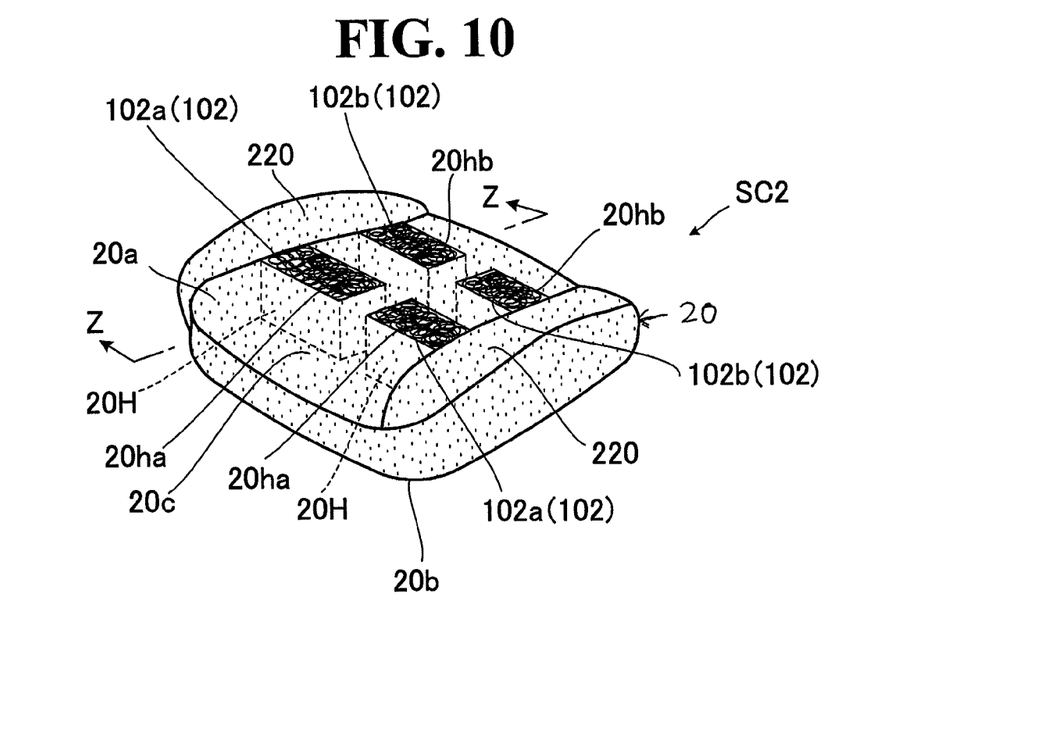
FIG. 10 is a schematic perspective view showing a foam padding to provided in the seat cushion 9 and a pair of three-dimensional network cushion elements arranged in the foam padding, in accordance with the fourth embodiment.

As shown in FIGS. 9 and 10, likewise as in the preceding first embodiment, the seat cushion SC2 includes: a main foam padding 20 formed of an urethan foam material, which has a seating surface area on which buttock and thigh portions MB and MT of a seat occupant M (see FIG. 11) are to be rested; and a pair of let and right foam padding portions 220 and 220 which protrude upwardly from a plane of that seating surface area of the main foam padding 20. Those two upwardly-protruding padding portions 220 and 220 constitute left and right side bolster portions 40 and 40 of the seat cushion SC2, respectively. The main foam padding 20 as well as the two upwardly-protruding padding portions 220 are covered with a breathable surface cover element 500 appropriately. While not shown, the bottom side of the main foam padding 20 is supportively received on a spring assembly comprising a plurality of S springs arrayed on a horizontal plane, wherein ends of such spring assembly are securely connected to an unshown seat cushion frame.

Figure 11:
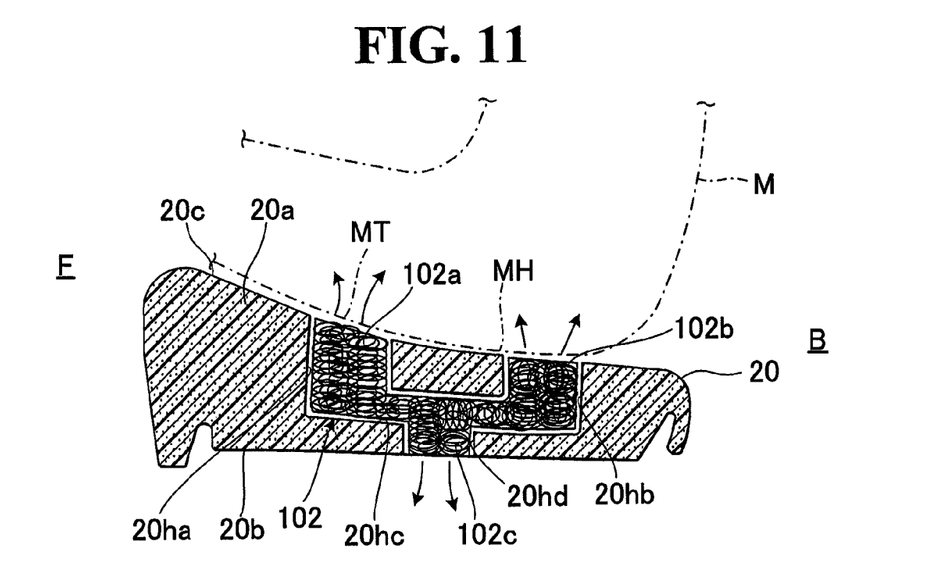
FIG. 11 is a sectional view taken along the line Z-Z in the FIG. 10.

The seat cushion SC2 differs from the previously-described seat cushions SC and SC1 in that the forward end portion 300f thereof slopes upwardly in the forward direction, as best seen in FIG. 11. In another words, the main foam padding 20 forming the seat cushion SC2 has a forwardly and upwardly sloped end portion 20c, as seen in FIGS. 10 and 11, and therefore, a thickness of that sloped end portion 20c is greatest of all other portions of the main foam padding 20.

Thus, from such upwardly sloped end portion 20c, the seat cushion SC2 becomes progressively smaller in height in the rearward direction thereof, thereby defining a rearward low area therein. At first, referring to FIGS. 9 to 11, let us mention that, in that rearward low area of the seat cushion SC2, a pair of spaced-apart left and right ventilation areas 102Fa and 102Fb are defined at one region 300t adapted to substantially receive two thigh portions MT and MT of a seat occupant M, respectively, and further, a pair of spaced-apart left and right ventilation areas 102Ra and 102Rb are defined at another region 300h adapted to substantially receive a buttock portion MB of the seat occupant M. Also, note that the first pair of ventilation areas 102Fa and 102Fb and the second pair of ventilation areas 102Ra and 102Rb are also in a spaced-apart relation with each other.

Now, the present fourth embodiment will be described in greater detail, in view of those four ventilation areas 102Fa, 102Fb, 102Ra and 102Rb.

Considering an actual structure of this fourth embodiment, referring to FIG. 9, let us now proceed with description of this embodiment, on the understanding that a first pair of ventilation areas 102Fa and 102Ra are defined in substantially a left half area of the seat cushion SC2, whereas a second pair of ventilation areas 102Fb and 102Rb are defined in substantially a right half area of the seat cushion SC2, for precise understanding.

Figure 12:
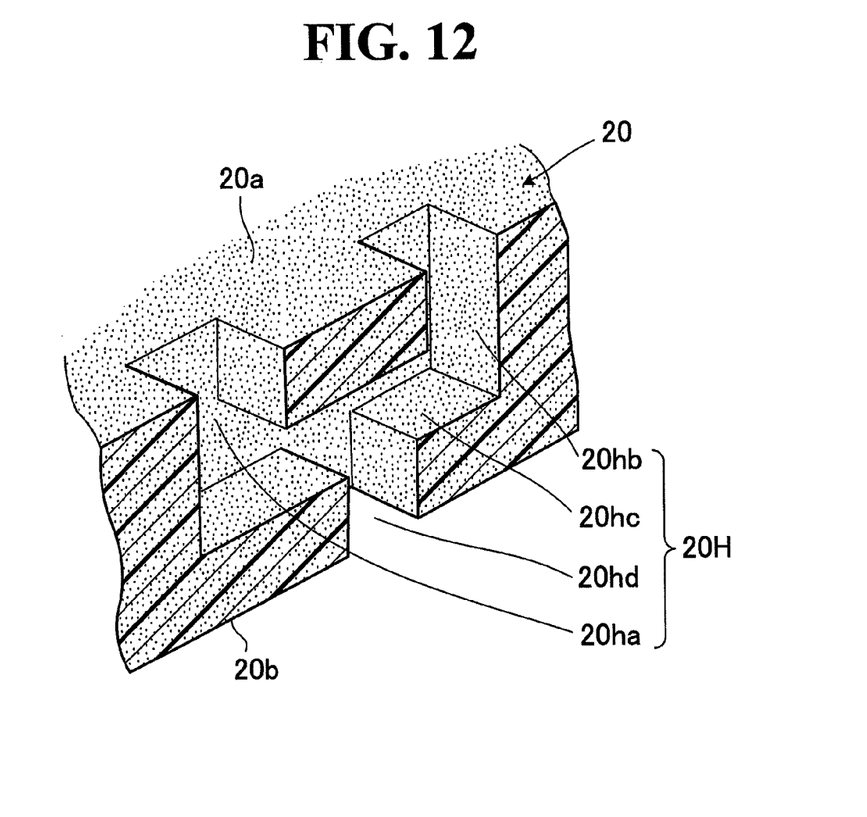
FIG. 12 is a fragmentary-sectional perspective view of the foam padding in the fourth embodiment.

Reference being now made to FIGS. 10 to 12, a pair of first and second air vents 20H and 20H, each being of a three-way configuration, are formed in the main foam padding 20 so as to be disposed in the left and right areas of the latter 20, respectively, in a spaced-apart relation with each other. In another words, the first three-way air vent 20H is defined at the aforesaid substantially left half area of the seat cushion in correspondence with the first pair of ventilation areas 102Fa and 102Ra, whereas the second three-way air vent 20H is defined at the aforesaid substantially right half area of the seat cushion in correspondence with the second pair of ventilation areas 102Fb and 102Rb.

Since those two air vents 20H are identical in shape and arrangement to each other, a specific description will be made only as to the first three-way air vent 20H and the first pair of ventilation areas 102Fa and 102Ra, (on the left in FIG. 10), for the sake of simplicity.

As shown in FIGS. 11 and 12, the three-way air vent 20H per se has: a first upper vent region 20ha; a second upper vent region 20hb; an intermediate vent region 20hc; and a lower vent region 20hd. Each of those three vent regions 20ha, 20hb and 20hd has a rectangular cross-section, as shown. It is observed that, within the main foam padding 20, both first and second upper vent regions 20ha and 20hb extend upwardly from the intermediate vent region 20hc that extends horizontally, and the lower vent region 20hd extends downwardly from that intermediate vent region 20hc. Hence, a whole of the air vent 20H assumes a three-way air passage configuration in the main foam padding 20, as illustrated.

The first upper vent region 20ha is disposed at a point corresponding to the first ventilation area 102Fa (on the left), whereas the second upper vent region 20hb disposed at a point corresponding to the second ventilation area 102Ra (on the left). Both first and second upper vent region 20ha and 20hb open in the upper surface 20a of the main foam padding 20. On the other hand, the lower vent region 20hd opens in the bottom surface 20b of the main foam padding 20. As shown in FIG. 12, those first and second upper vent regions 20ha and 20hb as well as the lower vent region 20hd are all in a through communication with the intermediate vent region 20hc. Accordingly, an air can be freely passed trough such three-way passage of the air vent 20H in a direction to and from the upper and bottom surfaces 20a and 20b of the main foam padding 20.

In the present embodiment, a network cushion element designated by 102 is provided, which has appropriate shape and size as shown. Of course, the network cushion element 102 may be formed by a plurality of the eccentric-core-type helical fibers 23 described above, by way of one example. A description will be made, using such type of network cushion element 102. In assembly, the network cushion element 102 is inserted and filled in the entirety of the three-way air vent 20H, as shown in FIG. 11, such that two upper end surfaces 102a and 102b of the network cushion element 102 are respectively exposed at two openings of the two upper vent regions 20ha and 20hb, which correspond to the first and second ventilation areas 102Fa and 102Ra, respectively, and further those two upper end surfaces 102a and 102b are substantially flush with the upper surface 20a of the main foam padding 20. Also, the lower end surface 102c of the network cushion element 102 are exposed at an opening of the lower vent region 20hd so as to be substantially flush with the bottom surface 20b of the main foam padding 20.

In this regard, it is understood that a pair of the network cushion elements 102 and 102 are inserted and filled in the first and second three-way air vents 20H and 20H, respectively, in the above-described manner, as shown in FIGS. 10 and 11.

Accordingly, moisture and heat emitted from the seat occupant's thigh and buttock portions MT and MB due to his or her vital warmth and perspiration will be escaped from the upper side of the seat cushion SC2 to the bottom side thereof via the first and second three-way network cushion elements 102 and 102, so that the moisture and heat may be effectively discharged outside of the seat cushion SC2 to prevent both thigh and buttock portions MT and MH from becoming sweaty. Preferably, one or more ventilation devices such as fan device (s) may be provided to the bottom side (at 20b) of the seat cushion SC2 appropriately for communication with the first and second network cushion elements 102 and 102 in order to facilitate escape of the moisture and heat from the seat occupant's thigh and buttock portions MT and MH.

It is added that the upper surface 20a of the main foam padding 20 as well as both two upper end surfaces 102a and 102b of the network cushion elements 102 are all covered with the breathable surface cover element 500, and that the bottom surface 20b of the main foam padding 20 as well as the opening of the lower vent region 20hd are contacted on and supported by a spring assembly (not shown) in substantially the same way as described in the first embodiment.

As constructed above, according to the present fourth embodiment, the pair of three-way air vents 20H and 20H are provided within the seat cushion SC2, independently of each other, so as to be disposed symmetrically relative to a center of the seat cushion SC2. And, respectively filled in those two air vents 20H and 20H are the pair of network cushion elements 102 and 102. Therefore, for substantially the same reasons as described in the preceding first embodiment, because of each network cushion element 102 being surrounded by the main foam padding 20, several localized regions of the main foam padding 2 are interposed between the left and right network cushion elements 102 and 102 and further interposed between the left upwardly-protruding portion 220 and left network cushion element 102 as well as between the right upwardly-protruding portion 220 and right network cushion element 102. Furthermore, all those network cushion elements 102 and localized regions of the main foam padding 20 are covered by one piece of the surface cover element 500.

Thus, in this fourth embodiment, it is to be appreciated that:

i) When the seat occupant's two thigh portions MT and MT are rested substantially upon the two forward ventilation areas 102Fa and 102Fb of the seat cushion SC2, respectively, loads given from the thigh portions MT are first exerted on the surface cover element 500 and then exerted on the two forward upper regions (at 102a and 102a) respectively associated with the two network cushion elements 102 add 102, whereupon most of the loads is transmitted via the surface cover element 500 over to the main foam padding 20 that surrounds each of the two forward upper regions (at 102a and 102a). Therefore, the loads are not intensively exerted on each forward upper region (at 102a) of the network cushion element 102, but most of the loads is absorbed in the main foam padding 20. As a result thereof, an amount of the load directly applied to each of two forward areas of the network cushion elements 102 is greatly reduced.

ii) Also, at that time, the seat occupant's buttock portion MH is rested substantially upon both two rearward ventilation areas 102Ra and 102Rb of the seat cushion SC2. Then, loads loads given from the buttock portion MH are first exerted on the surface cover element 500 and then exerted on the two rearward regions (at 102b and 102b) respectively associated with the two network cushion elements 102 and 102, whereupon most of the loads is transmitted via the surface cover element 500 over to the main foam padding 20 that surrounds each of those two rearward regions (at 102b and 102b). Therefore, the loads are not intensively exerted on each rearward upper region (at 102a) of the network cushion element 102, but most of the loads is absorbed in the main foam padding 20. Consequently, an amount of the load directly applied to each of the two rearward areas (at 102b) of the network cushion elements 102 is greatly reduced.

Accordingly, application of the loads to each of the two network cushion elements 102 is exceedingly decreased, thereby extremely lessening the possibility of its downward permanent settling, which therefore makes it exceptionally hard for the entire seat cushion SC2 to become permanently depressed downwards, notwithstanding a longtime use of the seat cushion. Also, by the virtue thereof, spaces among the fibers 23 are not narrowed, but are sufficiently maintained to assure smooth flow of air therethrough. This effectively provides unchanged good cushiony touch and unchanged smooth ventilation in the seat cushion SC2 for quite a long period of time. Therefore, a long useful life of the ventilative seat cushion can be realized.

Further, likewise as in all the preceding embodiments, the network cushion element 102 in this fourth embodiment may also employ the eccentric-core-type helical fiber 23 comprising the sheath portion 23a and the eccentric core portion 23b and may be formed from a plurality of such helical fibers 23 in the manner shown in FIGS. 4 to 6. In that case, one integral assembly of those helical fibers 23 forming the network cushion element 102 is endowed with a far-increased strength and resilient repulsive force, which greatly increases the durability of the network cushion element 102 against loads applied from the seat occupant's thigh and buttock portions MT and MB. Such an arrangement makes it exceedingly hard for the seat cushion SC2 to become permanently depressed downwards, notwithstanding its longtime use.

Additionally, as stated earlier, the forward end portion 300f of the seat cushion SC2 slopes upwardly from the forward regions at 102 of the network cushion elements 102, and the main foam padding 20 has a forwardly and upwardly sloped end portion 20c whose thickness is greatest of all other portions of the same 20. With such a configuration, a certain amount of the loads from the thigh portions MT is absorbed in that sloped end portion 20c and reduced in front of the network cushion elements 102, which in turn greatly decreases exertion of the loads on each network cushion element 102. As such, it is possible to extremely lessen the possibility of downward permanent depression of the seat cushion SC2, hence offering an unchanged good cushiony support and unchanged smooth ventilation to a seat occupant, so that a long useful life of the ventilative seat cushion can be realized.

While having described the present invention thus far, it should be understood that any modification, replacement and addition will be applied to the invention, without departing from the scopes of the appended claims. For example, an warm air heater and/or a cold air blast may be provided adjacent to the network cushion element (10, 101 or 102) to warm or cool any desired one of the seat occupant's thigh, buttock and back portions.

What is claimed is:

1. A seat cushion with a ventilation function for a seat occupant, said seat cushion comprising:
    a foam padding provided in said seat cushion, said foam padding having:
        an upper surface facing an upper side of said seat cushion on which said seat occupant sits; and
        a bottom surface facing a bottom side of said seat cushion; and
    a three-dimensional network cushion element having an air permeable property, said three-dimensional network cushion element comprising a plurality of fibers, each fiber being of a sheathed core construction and including:
        a core portion; and
        a sheath portion covering outer surfaces of said core portion,
    wherein said three-dimensional network cushion element is disposed within said foam padding at a point on which a body portion of said seat occupant is to be contacted at said seat cushion,
    wherein each fiber of said plurality of fibers is an eccentric-core-type fiber in which said core portion is disposed eccentrically within said sheath portion so as to be apart from a central axis of the sheath portion, wherein said sheath portion of each fiber of said eccentric-core-type fibers comprises a thick region and a thin region defined by a position of the core portion thereof, and wherein said three-dimensional network cushion element is formed by a plurality of said eccentric-core-type fibers which are partly contacted and fused with one another, such that a first outer surface of the sheath portion of one fiber of said eccentric-core-type fibers is partly contacted and fused, only at the thick region of the sheath portion, with a second outer surface of the sheath portion of at least one fiber of remaining eccentric-core-type fibers, said second outer surfaces being only at the thick region of said at least one fiber of the remaining eccentric-core-type fibers.

2. The seat cushion with the ventilation function according to claim 1, wherein said three-dimensional network cushion element is formed by a plurality of said eccentric-core-type fibers which are partly contacted and fused with one another, such that, for at least a majority of said eccentric-core-type fibers, said first outer surface of said sheath portion of one fiber of said eccentric-core-type fibers are partly contacted and fused, only at the thick region of the sheath portion, with said second outer surface of the sheath portion of said at least one fiber of remaining eccentric-core-type fibers.

3. The seat cushion with the ventilation function according to claim 2, wherein said core and sheath portions are each formed from a thermoplastic synthetic resin material, said sheath portion having a lower melting point than said core portion, and wherein said three-dimensional network cushion element is formed by said plurality of eccentric-core-type fibers which are partly bonded with one another by thermal fusing in such a manner that outer surfaces of the sheath portion of one fiber of said eccentric-core-type fibers corresponding to the thick region thereof are partly bonded with outer surfaces of the sheath portion of the other fiber of said eccentric-core-type fibers corresponding to the thick region thereof.

4. The seat cushion with the ventilation function according to claim 2, wherein each fiber of said plurality of fibers is curved in a helical fashion, such that said thin region of said sheath portion is oriented inwardly of the fiber being thus helically curved, while said thick region of said sheath portion is oriented outwardly of the fiber being thus helically curved, thereby providing a helical fiber whose all outer sides in which said thick region exists are exposed outwardly over all strokes of helix of the helical fiber, wherein a plurality of said helical fibers are provided, and wherein fibers of said plurality of said helical fibers are bonded with one another at predetermined points.

5. The seat cushion with the ventilation function according to claim 1, wherein at least said upper surface of said foam padding is covered with a breathable surface cover element.

6. The seat cushion with the ventilation function according to claim 1, wherein said body portion of said seat occupant is two thigh portions of the seat occupant, wherein a pair of said three-dimensional network cushion elements are provided, wherein said pair of said three-dimensional network cushion elements are disposed in said foam padding in a manner spaced apart from each other, such that one element of said pair of said three-dimensional network cushion elements is situated at a first point on which one of said two thigh portions is to be entirely or partly contacted, whereas the other element of said pair of said three-dimensional network cushion elements is situated at a second point on which the other element of said two thigh portions is to be entirely or partly contacted, and wherein at least said upper surface of said foam padding is covered with a breathable surface cover element.

7. The seat cushion with the ventilation function according to claim 1, wherein said body portion of said seat occupant is one set of thigh and knee portions of the seat occupant and another set of thigh and knee portions of the seat occupant, wherein a pair of said three-dimensional network cushion elements are provided, wherein said pair of said three-dimensional network cushion elements are disposed in said foam padding in a manner spaced apart from each other, such that one element of said pair of said three-dimensional network cushion elements is situated at a first point on which said one set of thigh and knee portions is to be entirely or partly contacted at said seat cushion, whereas the other element of said pair of said three-dimensional network cushion elements is situated at a second point on which said another set of thigh and knee portions is to be entirely or partly contacted at said seat cushion, and wherein at least said upper surface of said foam padding is covered with a breathable surface cover element.

8. The seat cushion with the ventilation function according to claim 1, wherein said body portion of said seat occupant is two thigh portions and buttock portion of the seat occupant, wherein said foam padding includes a pair of first areas on which said two thigh portions are to be entirely or partly contacted, respectively; and a pair of second areas on which said buttock portion is to be entirely or partly contacted, wherein said three-dimensional network cushion elements has an upper surface facing said upper side of said seat cushion and a bottom surface facing said bottom side of said seat cushion, wherein said three-dimensional network cushion elements is so formed to define:

a pair of first portions which are respectively disposed at two locations which substantially correspond to said pair of first areas of said foam padding, respectively;

said pair of first portions each having an end exposed at said bottom side of said seat cushion;

a pair of second portions which are respectively disposed at two locations which substantially correspond to said pair of second areas of said foam padding, respectively;

said pair of second portions each having an end exposed at said bottom surface of the three-dimensional network cushion element;

at least one intermediate portion defined between said pair of first portions and said pair of second portions;

both said pair of first portions and said pair of second portions extending from said at least one intermediate portion towards said upper surface of the three-dimensional network cushion element; and a third portion extending from said at least one intermediate portion to said bottom surface of said three-dimensional network cushion element, said third portion having an end exposed at said bottom side of said seat cushion, and wherein at least said upper surface of said foam padding is covered with a breathable surface cover element.

9. The seat cushion according to claim 1, wherein said three-dimensional network cushion element is disposed within said foam padding only at a first portion and at a second portion, the first portion corresponding to a first thigh of the seat occupant and the second portion corresponding to a second thigh of the seat occupant.

10. A seat back with a ventilation function for a seat occupant, said seat back comprising:
a foam padding provided in said seat back, said foam padding having:
a front surface facing a forward side of said seat back on which an upper body portion of said seat occupant contacts; and
a rear surface facing to a rearward side of said seat back; and
a three-dimensional network cushion element of an air permeable property, said three-dimensional network cushion element comprising a plurality of fibers, each fiber being of a sheathed core construction and including:
a core portion; and
a sheath portion covering outer surfaces of said core portion,
wherein said three-dimensional network cushion element is disposed within said foam padding at a point on which a predetermined part of said upper body portion of said seat occupant is to be contacted at said seat back,
wherein each fiber of said plurality of fibers is an eccentric-core-type fiber in which said core portion is disposed eccentrically within said sheath portion so as to be apart from a central axis of the sheath portion,
wherein said sheath portion of each fiber of said eccentric-core-type fibers comprises a thick region and a thin region defined by a position of the core portion thereof, and
wherein said three-dimensional network cushion element is formed by the plurality of said eccentric-core-type fibers which are partly contacted and fused with one another, such that a first outer surface of the sheath portion of one fiber of said eccentric-core-type fibers is partly contacted and fused, only at the thick region of the sheath portion, with a second outer surface of the sheath portion of at least one fiber of remaining eccentric-core-type fibers, said second outer surfaces being only at the thick region of said at least one fiber of the remaining eccentric-core-type fibers.

11. The seat back with the ventilation function according to claim 10, wherein wherein said three-dimensional network cushion element is formed by a plurality of said eccentric-core-type fibers which are partly contacted and fused with one another, such that, for at least a majority of said eccentric-core-type fibers, said first outer surface of said sheath portion of one fiber of said eccentric-core-type fibers are partly contacted and fused, only at the thick region of the sheath portion, with said second outer surface of the sheath portion of at least one of remaining eccentric-core-type fibers.

12. The seat back with the ventilation function according to claim 10, wherein said core and sheath portions are each formed from a thermoplastic synthetic resin material, said sheath portion having a lower melting point than said core portion, and
wherein said three-dimensional network cushion element is formed by said plurality of eccentric-core-type fibers which are partly bonded with one another by thermal fusing in such a manner that outer surfaces of the sheath portion of one fiber of said eccentric-core-type fibers corresponding to the thick region thereof are partly bonded with outer surfaces of the sheath portion of the other fiber of said eccentric-core-type fibers corresponding to the thick region thereof.

13. The seat back with the ventilation function according to claim 10, wherein each fiber of said plurality of fibers is curved in a helical fashion, such that said thin region of said sheath portion is oriented inwardly of the fiber being thus helically curved, while said thick portion of said sheath portion is oriented outwardly of the fiber being thus helically curved, thereby providing a helical fiber whose all outer sides in which said thick region exists are exposed outwardly over all strokes of helix of each of the helical fiber,
wherein a plurality of said helical fibers are provided, and
wherein fibers of said plurality of said helical fibers are bonded with one another at predetermined points.

14. The seat back with the ventilation function according to claim 10, wherein at least said front surface of said foam padding is covered with a breathable surface cover element.

15. The seat back with the ventilation function according to claim 10, wherein said predetermined part of said upper body portion of said seat occupant is a localized part of a back portion of the seat occupant, and wherein at least one piece of said three-dimensional network cushion element is disposed in said foam padding at a point on which said localized part of said back portion is to be contacted.

16. A vehicle seat comprising the seat cushion of claim 1.

17. A vehicle seat comprising the seat back of claim 10.

* * * * *